United States Patent [19]

Kuhajek et al.

[11] Patent Number: 5,135,674
[45] Date of Patent: Aug. 4, 1992

[54] SODIUM CHLORIDE DEICER COMPOSITION HAVING GELLING AGENT ADDITIVE TO MINIMIZE SPALLING OF CONCRETE

[75] Inventors: Eugene J. Kuhajek, Crystal Lake; Kurt J. Waatti, Woodstock, both of Ill.

[73] Assignee: Morton International, Inc., Chicago, Ill.

[21] Appl. No.: 657,624

[22] Filed: Feb. 20, 1991

Related U.S. Application Data

[63] Continuation of Ser. No. 443,020, Nov. 29, 1989, abandoned.

[51] Int. Cl.⁵ .................................................. C09K 5/00
[52] U.S. Cl. ........................................ 252/70; 252/71; 252/73; 252/74
[58] Field of Search .................... 252/70, 71, 73, 74

[56] References Cited

U.S. PATENT DOCUMENTS

| | | | |
|---|---|---|---|
| 4,094,805 | 6/1978 | Hansen | 252/70 |
| 4,148,938 | 4/1979 | Hansen | 427/136 |
| 4,338,359 | 7/1982 | Kestner | 252/70 |
| 4,430,240 | 2/1984 | Sandvig et al. | 252/70 |
| 4,606,835 | 8/1986 | Lieber et al. | 252/70 |
| 4,654,157 | 3/1987 | Fukunaga | 252/70 |
| 4,664,832 | 5/1987 | Sandvig et al. | 252/70 |
| 4,960,531 | 10/1990 | Connor et al. | 252/70 |

*Primary Examiner*—Paul Lieberman
*Assistant Examiner*—Bradley A. Swope
*Attorney, Agent, or Firm*—Wayne E. Nacker; Gerald K. White

[57] ABSTRACT

A deicer composition contains a deicing compound plus between about 0.5 and about 5.0 weight percent of a gelling agent, such as hydroxyethyl cellulose, to minimize spalling of concrete to which the deicer composition is applied.

2 Claims, No Drawings

SODIUM CHLORIDE DEICER COMPOSITION HAVING GELLING AGENT ADDITIVE TO MINIMIZE SPALLING OF CONCRETE

This is a continuation of co-pending application Ser. No. 07/443,020 filed on Nov. 29, 1989 now abandoned.

BACKGROUND OF THE INVENTION

The present invention relates to deicing compositions having additives which minimize the spalling of concrete.

Due to its availability and low cost, sodium chloride is by far the most widely used material for deicing roads, sidewalks, etc. A major, well-known problem with sodium chloride as a deicer is its effect on concrete. The use of sodium chloride as a deicer is known to greatly hasten the scaling or spalling of concrete, necessitating early repair or replacement of concrete structures. Other known deicing compounds, such as magnesium chloride, calcium chloride, potassium chloride and urea are also known to spall concrete.

Attempts have been made to formulate deicing compositions with various additives in order to reduce the spalling effect of sodium chloride on concrete. U.S. Pat. No. 4,094,805, issued to Hansen, describes the admixture of high molecular weight polyethylene oxide with sodium chloride. To the best of applicants' knowledge, such a composition has never been commercialized, at least to any significant degree. In their own tests of polyethylene oxide with sodium chloride as a deicer, applicants have found that this polymer tends to make a surface slippery which would tend to make it unsuitable for use on roads or sidewalks. Furthermore, the high price of this polymer would tend to make its use prohibitive in a deicing composition to be spread on concrete. Polyethylene oxide was also found to be less effective than compositions of the present invention described herein.

Subsequent U.S. Pat. No. 4,148,938, also issued to Hansen, describes the addition of carboxymethyl cellulose, an anionic polymer, to sodium chloride to prevent spalling of concrete. Carboxymethyl cellulose is a gelling agent and it is believed that its action is to pick up moisture and swell so as to close pores in concrete and create a partial seal against moisture and brine. It is explained, however, in this patent that in addition to the carboxymethyl cellulose, a "protecting agent", generally soda ash (Na$_2$CO$_3$), must be added. Otherwise, calcium ions that are available in the concrete react with the carboxyl groups of the carboxymethyl cellulose, precipitating and rendering ineffective the same. Such compositions have been commercialized on a limited basis. A major drawback to such a composition is the inclusion of soda ash or other highly alkaline, sodium-containing "protecting agent" which poses some danger to users of the composition, particularly if the composition or the brine resulting therefrom comes in contact with sensitive tissues, e.g., the eyes. Some jurisdictions are presently considering requiring a composition containing soda ash to be labeled as a potentially hazardous material.

SUMMARY OF THE INVENTION

In accordance with the present invention, there is provided a composition comprising a deicing compound and between about 0.5 and about 5.0 weight percent of a gelling agent based upon the weight of the deicing compound. Gelling agents are selected which do not require a "protecting agent".

DETAILED DESCRIPTION OF THE PRESENT INVENTION

Herein, all percentages are by weight unless otherwise noted and all percentages are based upon the weight of the deicing compound, e.g., sodium chloride. The term "deicing compound" is understood to include compounds which are in crude form, possibly containing appreciable amounts of impurities. For example, sodium chloride that is used as deicer is generally in crude, unrefined form.

Any of a variety of known deicing compounds are useful in accordance with the invention, including but not limited to sodium chloride, magnesium chloride, calcium chloride, potassium chloride and urea. The variety of salts and other compounds actually useful as deicers is broad, but in practice, cost is generally a determining factor. Sodium chloride, due to its low cost, is the most commonly used deicer. Mixtures of deicing compounds are also useful.

Additives to deicing compounds in accordance with the present invention include, but are not limited to hydroxyethyl cellulose; hydroxypropyl methyl cellulose; polysaccharides, particularly starches; hydroxyethyl-substituted starches; hydroxypropyl-substituted starches; hydroxypropyl guar, gum arabic and mixtures thereof. These are generally added to sodium chloride at between 0.5 and about 5.0 weight percent. Of these, the presently preferred gelling agent is hydroxyethyl cellulose, and most preferably the higher molecular weight hydroxyethyl celluloses which tend to have higher viscosities. Hydroxyethyl celluloses have molecular weights (number average) ranging from about 90,000–300,000. Those having molecular weights above about 1 million are preferred. Hydroxyethyl cellulose is typically provided in commercial form with a small amount of hydration inhibitor, such as glyoxal. Preventing hydration of the hydroxyethyl cellulose is believed advantageous in helping the hydroxyethyl cellulose dissolve at a faster rate, consistent with it acting most effectively to prevent spalling of concrete.

Anti-spalling additives used in accordance with the invention are selected which do not require a protecting agent as does carboxymethyl cellulose. By eliminating the protecting agent, the associated health hazards presented are eliminated. From a commercial standpoint, not having to label a product as potentially hazardous is of great advantage. The anti-spalling additives are all gelling agents. They do not require protecting agents either because they are non-ionic or substantially non-ionic.

In some cases, e.g., hydroxyethyl cellulose, the additives used in accordance with the invention are effective against spalling at lower levels than is carboxymethyl cellulose. This may allow a smaller amount of additive to be used relative to carboxymethyl cellulose to provide similar protection. As the additive gelling agent represents a significant cost, such savings are meaningful.

When sodium chloride is the deicer, the sodium chloride particles are sized for maximum effectiveness, with most particles falling between No. 4 and No. 14 U.S. Standard Sieve. A typical specification will be, for example: nothing above No. 4, less than 30% above No. 7, less than 5% below No. 14.

The anti-spalling additives are generally applied on the surface of the deicing particles. The gelling agents are used in powder form, and may be adhered to wetted deicer particles. As one method of providing compositions according to the invention, the deicer particles are placed in a mixer. To this is added a small volume of water, e.g., 2%, which is distributed over the surfaces of the deicer particles. When the gelling agent is then added, it becomes tacky and clings to the deicer particles.

In order that the final composition be free-flowing, a drying action may be needed. This can be accomplished by either conventional warm-air drying or by addition of a drying agent such as silicon, calcium silicate, or sodium silico aluminate. The drying agent may be present at between about 0.1 and about 2.0 weight percent. A preferred drying agent is calcium silicate, such as that sold under the trade name Hubersorb 600.

The invention will now be discribed in greater detail by way of specific examples.

EXAMPLES 1 AND 2

A. Test Method

Sakrete Sand Mix was purchased; this product contains cement, sand a very fine aggregate. The mortar was made according to the directions on the package. Specimens were cast into the shape of a Dixie cup and were cured according to ASTM C-192 prior to testing. The specimens were tapered; 1½" bottom diameter, 1174" top diamater with a height of 1⅜". It was necessary to produce the specimens in several batches. Only specimens from the same batch of concrete were used for a given experiment.

B. Testing and Results

Test No. 1

Conditions

Additive levels were 5% of wt. of NaCl; specimens were totally immersed; 10 F-T cycles with a freeze temperature of −15° F.

| Additive | % Spalled |
| --- | --- |
| Control | 37% |
| Polyacrylamide | <2% |
| Sodium Metasilicate | 11% |
| Polyethylene Glycol | 28% |
| Magnesium Aluminum Silicate | 30% |
| Polyvinyl Alcohol | 22% |
| Modified Starch | 7% |
| Micron Silica | 14% |
| Polyethylene Oxide | <2% |
| Hydroxyethylcellulose | <2% |

Test No. 2

Conditions

Additive levels were 5% of wt. of NaCl; specimens were totally immersed; 10 F-T cycles with a freeze temperature of −15° F.

| Additive | % Spalled |
| --- | --- |
| Control | 59% |
| Tannic Acid | 47% |
| Hydroxypropylmethylcellulose | 7% |
| Vinyl Acetate-Ethylene Co-Polymer | 8% |
| Gum Arabic | 2% |
| Modified Starch | 4% |
| Polyethylene Oxide | 5% |

| Additive | % Spalled |
| --- | --- |
| Bentonite | 38% |
| Xanthan Gum | 13% |
| Sodium Aluminate | 5% |

EXAMPLES 3-8

A. Test Method

1. Concrete Specimens

Concrete bricks were purchased locally. The brick dimensions are standard; 7⅝" long by 3⅝" wide by 2¼" deep, and they range in weight from 2150-2270 g. They are air-entrained, machine cast and contain large aggregates. They were tested in a variety of forms: whole, after cutting in halves, or after cutting into small rectangular blocks.

2. Test Solutions

4% deicer (NaCl or $CaCl_2$) solutions were used.

3. Test Conditions

Weighed specimens were placed in test brines and subjected to freezing temperature until solid (usually overnight) and followed by a thawing period. Each time a specimen is frozen and subsequently thawed is referred to as "one F-T cycle". A control specimen (specimen immersed in brine without additives) was run in every trial. Two separate freezers were used in the testing; one set at −15° F., the other at 0° F.

Two different brine exposure conditions were run throughout the testing. In some tests, specimens were totally submerged in the test solution, while in other tests specimens were half-immersed in the test solution. The worst spalling (of control specimens) occurred with the latter condition. In that condition, the spalling surprisingly was most severe to areas of the concrete that were above the brine level, but which, through capillary forces, had become wet with solution.

There was no set number of F-T cycles. A test was usually concluded when the control specimen was severely or totally spalled. In some tests, just 10 F-T cycles were run, while in others up to 30-35 cycles were run. The number of cycles was dependent on the test specimen, test condition, etc.

4. Test Evaluation

At the conclusion of a given test, the specimens were removed from the solution, immersed in water and scrubbed with a bristle brush to remove any loosely adhering concrete particles. After air-drying, the specimens were reweighed and weight loss calculated as % spalled:

$$\% \text{ Spalled} = \frac{\text{Orig. Wt. of Spec.} - \text{Wt. of Spalled Spec.}}{\text{Original Wt. of Specimen}} \times 100$$

In some experiments, a specimen's weight loss may have been very small or specimen may have actually slightly gained weight due to residual sodium chloride. In these cases, <2% is reported for % spalled. Some specimens showed slight or very slight spalling, but weight loss was insignificant. Therefore, a rating scale was also used to describe spalling of specimens, as given below:

| Spall Rating | Degree of Spalling |
| --- | --- |
| 0 | No spalling |
| 1 | Very slight |

-continued

| Spall Rating | Degree of Spalling |
|---|---|
| 2 | Slight |
| 3 | Moderate |
| 4 | Substantial |
| 5 | Severe |
| 6 | Total or Almost Total Spalling |

B. Testing and Results

Test No. 3

Conditions

Whole concrete bricks were used; additive levels were 5% of the weight of NaCl (0.2% in 4% NaCl solution); the bricks were half-immersed; 30 freeze-thaw (F-T) cycles were run with a freeze temperature of 0° F.

| Additive | % Spalled | Spall Rating |
|---|---|---|
| Control | 73% | 6 |
| Hydroxyethyl cellulose | <2% | 2 |
| Hydroxypropyl methyl cellulose | <2% | 1 |
| Modified Starch (Instant Clear Gel) | 3% | 3½ |

Test No. 4

Conditions

Concrete bricks were cut in half; additive levels were 5% of wt. of NaCl; specimens were totally immersed; 30 F-T cycles were run with a freeze temperature of 0° F.

| Additive | % Spalled | Spall Rating |
|---|---|---|
| Control | 14% | 5 |
| Hydroxyethyl cellulose | <2% | 1½ |
| Hydroxypropyl methyl cellulose | <2% | 0 |
| Modified Starch (Instant Clear Gel) | <2% | 3 |

Test No. 5

Conditions

Concrete bricks were cut into six equal blocks; additive levels were 1% by wt. of NaCl; specimens were half-immersed; 20 F-T cycles were run at a freeze temperature of 0° F.

| | % Spalled | Spall Rating |
|---|---|---|
| Control | 57% | 6 |
| 1% Carboxymethyl cellulose | 71% | 6 |
| 1% Hydroxyethyl cellulose | 4% | 2 |
| 1% Hydroxypropyl methyl cellulose | 9% | 3½ |

Test No. 6

Conditions

Concrete bricks were cut into six equal specimens; specimens were half-immersed; additive levels were 5% of wt. of NaCl; 15 F-T cycles were run with a freeze temperature of 0° F.

| Additive | % Spalled | Spall Rating |
|---|---|---|
| Control | 53% | 6 |
| Carboxymethyl cellulose | 53% | 6 |
| Hydroxyethyl cellulose | <2% | 1½ |
| Hydroxypropyl methyl cellulose | <2% | 1 |
| Modified Starch (Staley C3-450) | 7% | 4½ |

Test No. 7

This test evaluated the effects of additives with $CaCl_2$ as the deicer.

Conditions

Bricks were cut into six equal specimens; specimens were half-immersed; 12 F-T cycles were run with a freeze temperature of 0° F.

| Additive | % Spalled | Spall Rating |
|---|---|---|
| Control | 80% | 6 |
| 2½% Carboxymethyl cellulose + 1% $Na_2CO_3$ | 34% | 5½ |
| 1% Carboxymethyl cellulose + 1% $Na_2CO_3$ | 31% | 5½% |
| 2½% Hydroxyethyl cellulose | <2% | 2 |
| 1% Hydroxyethyl cellulose | <2% | 1½ |

Test No. 8

Conditions

Concrete bricks were cut into 8 rectangular specimens; specimens were half-immersed; 11 F-T cycles were run with a freeze temperature of 0° F.

| Sample | % Spalled | Spall Rating |
|---|---|---|
| Brick #1 | | |
| Control | 85% | 6 |
| Control | 100% | 6 |
| 1% Hydroxyethyl cellulose | <2% | 1 |
| 1% Hydroxyethyl cellulose | 5% | 2½ |
| 1% Hydroxypropyl guar | 3% | 2½ |
| 1% Hydroxypropyl guar | <2% | 1 |
| 1% Polyethylene Oxide | 6% | 3½ |
| 1% Polyethylene Oxide | 15% | 4 |
| Brick #2 | | |
| Control | 32% | 5 |
| Control | 83% | 6 |
| 0.5% Hydroxyethyl cellulose | 3% | 2 |
| 0.5% Hydroxyethyl cellulose | 7% | 2½ |
| 0.5% Hydroxypropyl guar | <2% | 1 |
| 0.5% Hydroxypropyl guar | 5% | 2 |
| 0.5% Polyethylene Oxide | 8% | 4 |
| 0.5% Polyethylene Oxide | 15% | 5 |

While the invention has been described in terms of certain preferred embodiments, modifications obvious to one with ordinary skill in the art may be made without departing from the scope of the present invention.

Various features of the invention are recited in the following claims.

What is claimed is:

1. A dry, free-flowing deicing composition consisting essentially of sodium chloride in particulate form and between about 0.5 and about 5.0 weight percent of a gelling agent based upon the weight of said sodium chloride, said gelling agent being selected from the group consisting of hydroxyethyl cellulose; hydroxypropyl methylcellulose; hydroxypropyl guar and mixtures thereof, said gelling agent being in powder form and exclusively adhered to the external surfaces of the particulates of said sodium chloride.

2. A deicing composition according to claim 1 wherein said gelling agent is hydroxyethyl cellulose.

* * * * *